United States Patent [19]

Kos et al.

[11] 4,420,692

[45] Dec. 13, 1983

[54] MOTION RESPONSIVE WIND TURBINE TOWER DAMPING

[75] Inventors: Joseph M. Kos, Holyoke, Mass.; John P. Patrick, South Windsor; Kermit I. Harner, Windsor, both of Conn.

[73] Assignee: United Technologies Corporation, Hartford, Conn.

[21] Appl. No.: 364,706

[22] Filed: Apr. 2, 1982

[51] Int. Cl.$^3$ .......................... F03D 9/00; F03D 7/04
[52] U.S. Cl. ........................ 290/44; 290/55; 416/41; 416/43; 416/30; 416/35
[58] Field of Search ............ 290/44, 55; 416/41, 416/43, 30, 35

[56] References Cited

U.S. PATENT DOCUMENTS

| | | | |
|---|---|---|---|
| 4,160,170 | 7/1979 | Harner et al. | 290/44 |
| 4,161,658 | 7/1979 | Patrick | 290/44 |
| 4,189,648 | 2/1980 | Harner | 290/44 |
| 4,193,005 | 3/1980 | Kostiali | 290/55 X |

Primary Examiner—J. V. Truhe
Assistant Examiner—Terry Flower
Attorney, Agent, or Firm—M. P. Williams

[57] ABSTRACT

An accelerometer (1) disposed on the support tower (12) of a wind turbine electric generating system in the vicinity of the rotor (10, 16) thereof provides a signal (1) indicative of acceleration of the tower in the direction of the rotor rotational axis. The signal (2) is passed through a band-pass filter (4) for summation (9) with a torque/power controlled (100) blade pitch angle reference rate signal (98), the integral (104) of which provides a blade pitch angle reference signal (40) to control the pitch angle of the rotor blades (10) through a pitch change mechanism (38), thereby to provide additional, positive aerodynamic damping to the tower while modulating blade angle for constant torque/power in response to wind turbulence.

4 Claims, 1 Drawing Figure

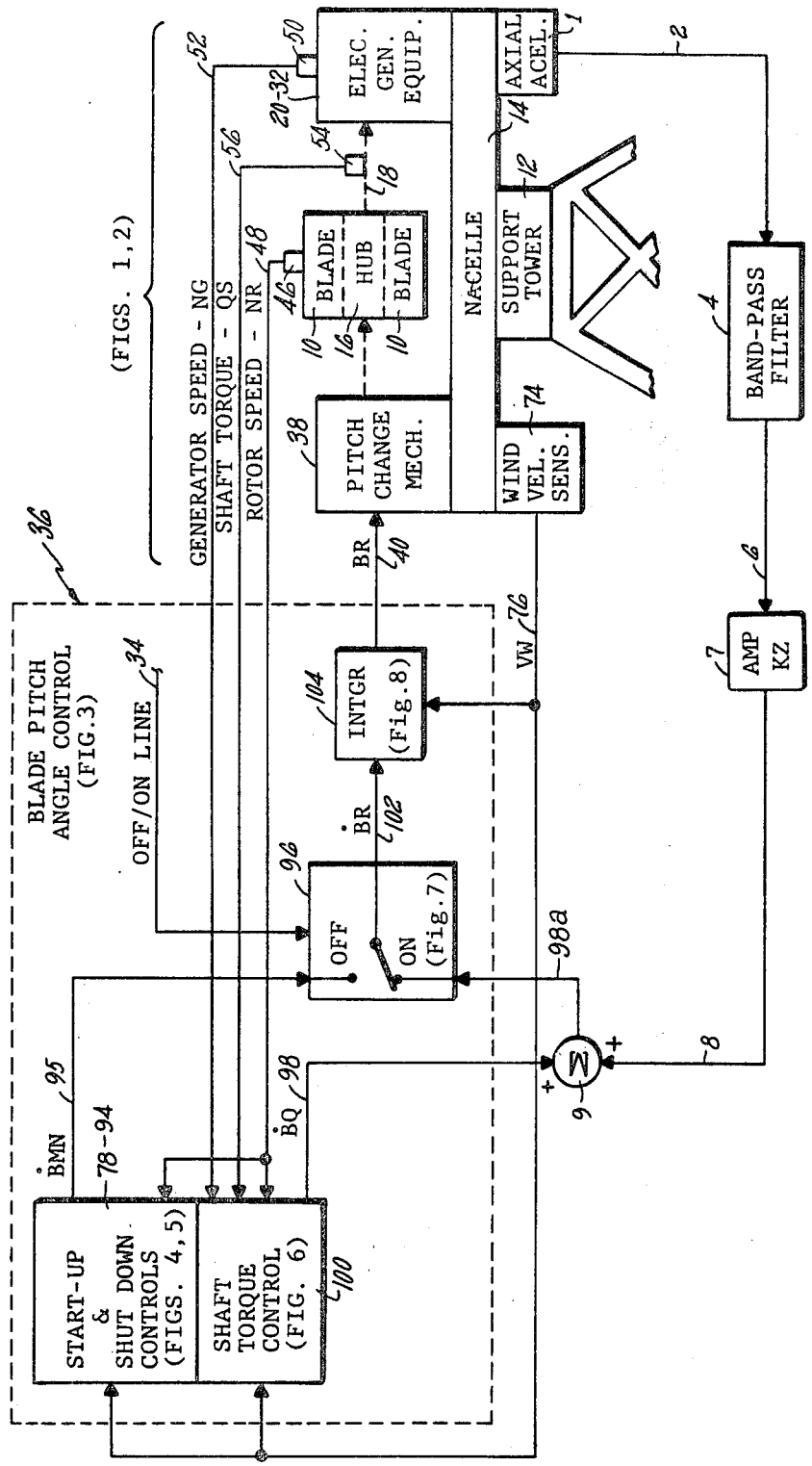

MOTION RESPONSIVE WIND TURBINE TOWER DAMPING

DESCRIPTION

1. Technical Field

This invention relates to tower-mounted wind turbine electric power generating systems, and more particularly to damping the tower primary resonant frequency while modulating the rotor blade angle to maintain rated torque or power.

2. Background Art

The use of wind as a low cost source of electrical energy has the obvious drawback of being dependent upon wind conditions. To make a wind turbine electric generating system both useful and economically viable, it is necessary to ensure operation of the wind turbine over a wide range of wind conditions and over the largest fraction of time possible. Therefore, wind turbines are typically located (sometimes in clusters called "wind energy farms") where the prevailing wind conditions are relatively favorable; that is, where there is sufficient velocity over a rather large portion of the time. However, when the wind is of sufficient strength for useful electric power generation, it is usually gusty during a significant fraction of the time.

For efficient wind generation, very large blades (pairs of blades totaling on the order of 30 to 100 meters in length) are mounted at the top of very tall towers (such as between 30 meters and 90 meters in length). Because the wind turbine is connected directly to the electric generator and power system (albeit through gearing and resilient coupling shafts), maintaining the desired level of electrical power output (so that it can contribute to the total energy supplied to an electric distribution grid) requires modulating blade angle to accommodate the effects of unpredictable wind gusts and turbulence on the power developed by the wind turbine. Therefore, systems have been provided to monitor either the desired rotor shaft torque of the wind turbine rotor, or the power generated by the generator and to utilize variations in either of these factors to modulate the pitch angle of the rotor blades in such a fashion so as to maintain rated power for wind speeds at and above the rated wind velocity. Because the torque and power are directly related by the rotary speed of the generator, these terms are used interchangeably herein and are referred to alternatively as torque/power. Maximum effect is when the blades have low pitch (the blade surfaces are essentially perpendicular to the rotor shaft), and minimum effect occurs when the blades are at maximum angle of approximately 90° (the surfaces are basically parallel to the rotor shaft), which is referred to as being "feathered". A blade angle control system of this type is disclosed in our U.S. Pat. No. 4,193,005.

A tall wind turbine support tower, with very large blades, shafts and gearing, electric generating equipment, and miscellaneous control and protective equipment disposed at the top thereof, is necessarily a cantilevered mass, having a stiffness constant and a structural damping ratio. Any force will excite the primary tower resonance.

The thrust on the blades (caused by the wind acting on the blades parallel to the rotary axis of the wind turbine rotor) is a force which tends to accelerate the wind turbine equipment in the direction of the wind. The top of the wind turbine tower therefore assumes (in steady state conditions) a position where the thrust force is balanced by the stress force developed in the tower structure, depending on tower stiffness. If the wind velocity changes (a gust), this alters the net force on the equipment at the top of the tower and causes the tower to sway back and forth (oscillate) in a direction parallel with the wind force. When the wind velocity is below that which will produce rated power, the rotor blade angle may be fixed, or it may be modulated slightly to optimize energy capture as wind velocity changes. With a fixed (or nearly constant) blade angle, the thrust (longitudinal wind force) on the blades will increase with increasing wind velocity in all cases, and therefore any motion of the top of the tower will provide positive aerodynamic damping to the tower (in the same sense as the tower structural damping). In such case, the oscillation of the tower in its primary bending mode, in response to an incremental force due to a wind gust, will damp out, and be of little concern. Above rated wind speed (that which will produce rated power), the power control reacts to power or torque variations caused by wind gusts or turbulence to adjust (modulate) the rotor blade angle in a manner to tend to maintain power or torque constant. As wind velocity increases, if power is held constant, thrust inherently decreases. Thus, blade modulation, in response to a gust, to maintain constant power, inherently results in an opposite incremental thrust, which is therefore in a direction to provide negative aerodynamic damping to the tower. This negative damping subtracts from the tower structural damping and results in increased tower oscillations. In wind turbines designed for maximum wind energy capture and close power control, the negative damping may exceed the structural damping during power-controlled operation. This yields a net negative damping on the tower so the tower becomes unstable (tower motion increases with each cycle thereof at the primary tower resonant frequency). In fact, detailed analysis has shown that interaction between the tower and the torque/power control can result in severe degradation of tower fatigue life, from several tens of years to on the order of a few years.

Initial consideration of the problem may bring to mind the utilization of notch filter, to severely curtail blade angle correction at a blade angle command frequency relating to the first bending mode frequency of the tower and its apparatus. However, this approach results in large transient errors in power generated, because of a reduction in the response characteristics of the power control loop. It has also been suggested that a blade angle pitch change rate could be augmented on a signal taken from tower bending to provide effective damping on the tower; however, nothing has come of such suggestion.

DISCLOSURE OF INVENTION

Objects of the invention include providing adequate positive damping to a wind turbine tower while allowing a power control to modulate blade angle to minimize torque or power fluctuations resulting from wind turbulence.

In accordance with the present invention, a wind turbine powered electric generating system, having a control to modulate rotor blade angle to maintain rated torque or power in turbulent wind, disposed at the top of a tower, provides a blade angle command component which will adjust the turbine rotor blade angle in a manner to provide positive aerodynamic damping of the tower in response to a signal indicative of longitudinal motion of the tower parallel to the rotor axis.

In an exemplary embodiment of the present invention, the accelerometer is disposed at the top of a tower on which is mounted the rotor, electric generating equipment, controls and other apparatus of a wind turbine electric generating system. The acceleration signal output is filtered and fed to the rotor blade angle control system as a corrective pitch blade reference rate signal component, which when added to a power control pitch angle reference rate signal and integrated, provides a blade pitch angle reference signal which provides positive damping to the tower. In further accord with the present invention, the accelerometer output signal is processed to provide band-pass filtering before utilization thereof in generating a blade angle reference rate signal, to eliminate extraneous signals which may occur at frequencies not of interest to the control system.

The invention effectively generates incremental thrust variations through incremental changes in blade angle occurring as a result of wind gusts, which at the primary bending mode frequency of the tower, are in phase with velocity at the top of the tower, thereby acting as a positive damping thrust. While the invention requires additional, active apparatus (accelerometer) on the tower, it provides a relatively simple manner of providing additional positive damping on the wind turbine tower primary bending mode, with virtually no adverse effect on the desired electric power generation.

The signal processing involved in implementing the present invention may be provided, depending upon the system in which it is employed, in an analog or digital fashion, employing discrete dedicated hardware elements or suitable program adjustments in a computer utilized to control blade angle, such as a microprocessor.

The foregoing and other objects, features and advantages of the present invention will become more apparent in the light of the following detailed description of exemplary embodiments thereof, as illustrated in the accompanying drawing.

BRIEF DESCRIPTION OF DRAWING

The sole FIGURE herein is a simplified, schematic block diagram of a wind turbine including a blade pitch angle control, incorporating the positive tower damping of the present invention.

BEST MODE FOR CARRYING OUT THE INVENTION

An exemplary embodiment of the present invention is disclosed as it may be implemented in a multi-mode control system for wind turbines of the type disclosed in our aforementioned U.S. Pat. No. 4,193,005. A general description of the control system disclosed in said patent is first given with respect to reference numbers 10-104 in the drawing herein, which are the same as those of said patent; the parenthetical references to figure numbers are to figures of said patent. Thereafter, embodiments of the invention are described with respect to reference numbers 1-9.

Referring now to the drawing, a representative wind turbine construction consists of two diametrically opposed identical rotor blades 10, typically totaling between 30 meters and 100 meters in length, mounted on a support tower 12. The mechanical components, control devices and electrical generating equipment which comprise the wind turbine are contained in a nacelle 14 supported by the tower 12. The construction of wind turbines and accessory equipment therefor, such as yaw controls for orienting the blades into the prevailing wind, are all well known and are not described further herein.

The turbine rotor blades 10 are mounted on a hub 16 which is connected through a low speed coupling shaft 18 to electric generating equipment 20-32 which may include a gear box, a high speed shaft, a synchronous generator, equipment for connecting the generator to a load (such as the power grid of an electrical utility), and phase synchronizing circuitry. The electric generating equipment 20-32 provides an off/on line signal on a signal line 34 indicative of when the generator is connected on line to the utility grid.

A blade pitch angle control 36, shown generally in FIG. 3 of said patent, provides a desired or reference blade angle signal BR to an electrohydraulic pitch change mechanism 38 over a line 40. The pitch change mechanism 38 causes the blades 10 to achieve an actual blade angle (BP, in said patent) equal to the reference blade angle signal BR on the line 40.

Signals indicative of instantaneous operating parameters of the wind turbine are provided to the blade pitch angle control 36. A rotor speed transducer 46 associated with the hub 16 provides a rotor speed signal NR on a line 48. A similar transducer 50 connected to a shaft in the synchronous generator provides a generator speed signal NG on a line 52. A torque transducer 54, which may comprise strain gauges disposed on the shaft 18, or on a suitable shaft within the electric generating equipment 20-32, provides a shaft torque signal QS on a line 56. The shaft torque signal on the line 56 may alternatively be provided in any other suitable way, such as by sensing relative position of axially displaced points on the periphery of the shaft, in a well known manner. The blade pitch angle control 36 is also provided a plurality of fixed or variable reference signals indicative of a reference idle rotor speed, limits on rotor acceleration and deceleration, and a start/stop signal indicative of when the wind turbine is to be operative or feathered and essentially stationary. These signals are described more fully with respect to FIG. 2 of said patent. A wind velocity sensor 74, disposed on the nacelle 14, provides a signal indicative of average wind velocity VW on a line 76.

When the wind turbine is not in use, the blades 10 are positioned at their maximum pitch angle (90°), so that they are feathered. Thus, the blades will exert essentially no torque on the hub 16. When the wind turbine is to be put into use, a start signal causes the start-up and shutdown controls 78-94 (not so called in said patent, and described more particularly in FIGS. 4 and 5 of said patent) to gradually decrease the blade angle so as to accelerate the rotor and generator toward rated speed conditions without either blade stall or the inducing of large acceleration stresses. Once the wind turbine rotor is operating at an angular speed which relates in the desired fashion to the generated electric power frequency which is necessary, the speed can then be varied slightly until the electric generating equipment 20-32 is operating synchronously with the frequency of electric power on the utility grid to which the generator will ultimately be connected. After the generator is connected to the grid, control is shifted from the start-up and shutdown control 78-94 to the shaft torque control 100 (described in detail with respect to FIG. 6 of said patent). And, if the wind turbine is to be shut down, control reverts to the start-up and shutdown controls 78-94 so as to cause the blades to be feathered without excessive deceleration stresses. As described in said patent, the minimum blade angle rate signal BMN on line 95 is such as will cause a change in blade angle necessary to maintain a fixed rate of rotor angular acceleration during start-up, to maintain the proper angular rotational speed during idle, and to maintain a fixed rate of rotor angular deceleration during shutdown.

When the electric generating equipment 20-32 is phased synchronously with the voltage on the power grid (same frequency, amplitude and phase), the equipment is connected to the power grid and a signal appears on the line 34 to indicate that the wind turbine is on-line. The transition between on-line operation and off-line operation is effected by a mode selector 96 (described in more detail with respect to FIG. 7 in said patent) which responds to the off/on line signal 34. When that occurs, the mode selector 96 applies a shaft torque blade angle rate signal BQ on a line 98 (discounting the improvement of the invention which is described hereinafter) to a line 102 where it becomes the blade angle reference rate signal BR; but when the wind turbine is off-line, the absence of the signal on the line 34 causes the line 102 to be responsive to the minimum rate signal BMN on a line 95. When the wind turbine is on-line, the torque blade angle rate signal on line 98 is such as will extract maximum power from the wind turbine up to the rated power value for all wind speeds between cut in and cut out; at and above rated wind speed, the signal on line 98 is varied to maintain the sensed shaft torque (or power) at the reference (rated) value.

The selected desired blade angle rate signal, the blade angle reference rate signal BR on line 102, is converted into the blade angle reference signal BR on the line 40 by means of an integrator 104 (described more fully with respect to FIG. 8 in said patent). The integrator 104 includes apparatus to limit the rate of change of the signal on the line 40 as well as to limit the maximum positive and negative magnitudes thereof.

The description thus far with respect to reference numbers 10-104 is descriptive of an exemplary control system of the prior art in which the present invention may be practiced. This description is a summary of that in our aforementioned patent. As described briefly hereinbefore, the adverse coupling between the primary bending mode of the support tower 12 and the wind turbine control system described thus far is alleviated by the present invention through the expedient of providing additional blade angle reference command components to cause incremental thrust variations in phase with the velocity of the top of the tower, thereby providing additional, positive aerodynamic damping to the tower. This assures damping-out any tower oscillations induced by perturbations on the loading of the blades and the commensurate correction of blade angle, such as is caused by unpredictable wind turbulence. This problem is analyzed in detail in our commonly owned, copending U.S. patent application, Ser. No. 364,707, filed Apr. 4, 1982 and entitled Predicted Motion Wind Turbine Tower Damping, which is incorporated herein by reference.

Briefly, an accelerometer 1 is mounted so that its sensitive axis is parallel with the rotor shaft of the wind turbine, the output signal thereof on a line 2 being fed to a band-pass filter 4, the output of which on a line 6 is passed through an amplifier 7 and applied by a signal line 8 to a summing amplifier 9, in which the filtered acceleration signal is added to the torque blade angle rate signal BQ on the line 98.

The accelerometer 1 may be of the type utilized to measure low level accelerations, such as vibrations or sway in buildings, towers or bridges and the like. One suitable accelerometer is the Vibramite Model 1030 available from Vibra-Metrics, Inc., East Haven, Conn., U.S. That device has a washout filter characteristic built right into it, which provides part of the function of the band-pass filter 4; in such case, a lag filter (in place of band-pass filter 4) will be suitable. However, other models not having a washout filter incorporated therein may be utilized by provision of a complete band-pass filter 4. The purpose of the band-pass filter is to eliminate any response to long-term steady state outputs of the accelerometer (such as long-term null drift), as well as to high frequency components (harmonics and noise), all of which are of no use in controlling tower damping. For a large tower of the type described, the band-pass filter may be first order (or higher order if desired), with break points of 0.1 radian/second and 1.0 radian/second, with a pass center at 0.3 radian/second. The upper break point may be slightly below the tower primary bending frequency; the break points may be adjusted for maximum desirable response (including phase adjustment of the induced torque with the tower motion). A ten second washout filter in series with a one second lag filter may be appropriate. The amplifier 7 has a gain KZ selected to provide the desired response. The filter 4 and gain 7 may be implemented in a suitable computer program, in a manner analogous to that illustrated in our aforementioned copending application.

Other motion responsive devices (such as optical) may be used in place of the accelerometer 1, provided the motion indicating signal thereof is suitably processed to provide an acceleration input to the junction 9; or, a velocity signal could be summed with BR at line 40 instead. The invention may be used in the off-line mode as well. The implementation may vary widely; all that is required is to provide a blade reference signal, of suitable magnitude and phase with respect to tower motion, so as to provide additional positive aerodynamic damping to the tower.

Similarly, although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. A wind turbine system for generating electric power, comprising:
   a tower;
   a rotor disposed on said tower including blades disposed for rotation about an axis and a blade pitch angle change mechanism;
   means for providing an actual torque/power signal indicative of actual torque/power generated by said wind turbine system; and
   signal processing means for providing a reference torque/power signal indicative of desired generated torque/power, and for providing to said blade pitch angle change mechanism a blade pitch angle reference signal as a function of the difference between said actual torque/power signal and said reference torque/power signal;

characterized by:

motion responsive means disposed on said tower in the vicinity of said rotor for providing a motion signal indicative of motion of said tower parallel with said blade rotation axis; and said signal processing means comprising means for providing said blade pitch angle reference signal as a function of both said motion signal and the difference between said actual torque/power signal and said reference torque/power signal.

2. A wind turbine system according to claim 1 characterized by said motion responsive means comprising an accelerometer; and said signal processing means comprising means for providing said blade pitch angle reference signal as an integral function of said motion signal.

3. A wind turbine system according to claim 1 characterized by said motion responsive means comprising an accelerometer; and said signal processing means comprising means for providing said blade pitch angle reference signal as an integral function of the summation of said motion signal with a signal indicative of the difference between said actual torque/power signal and said reference torque/power signal.

4. A wind turbine system according to claim 1 characterized by said signal processing means comprising means for providing said blade pitch angle reference signal as a band-pass filtered function of said motion signal, the passband of said filtered function passing signals at the primary bending frequency of said tower.

* * * * *